United States Patent
Ryerson

(10) Patent No.: US 9,167,512 B2
(45) Date of Patent: Oct. 20, 2015

(54) METHODS AND APPARATUS FOR USE IN CONTROLLING CONNECTIONS TO WIRELESS NETWORKS

(71) Applicant: BLACKBERRY LIMITED, Waterloo (CA)

(72) Inventor: Christopher Maybee Ryerson, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 190 days.

(21) Appl. No.: 13/713,313

(22) Filed: Dec. 13, 2012

(65) Prior Publication Data

US 2014/0171078 A1      Jun. 19, 2014

(51) Int. Cl.
*H04W 48/02* (2009.01)
*H04W 48/18* (2009.01)

(52) U.S. Cl.
CPC ..................... *H04W 48/18* (2013.01)

(58) Field of Classification Search
CPC ...... H04W 48/18; H04W 48/08; H04W 48/16
See application file for complete search history.

(56) References Cited

U.S. PATENT DOCUMENTS

| 2010/0100930 | A1* | 4/2010 | King ................................. | 726/1 |
| 2013/0007853 | A1* | 1/2013 | Gupta et al. ..................... | 726/5 |

FOREIGN PATENT DOCUMENTS

| EP | 1492302 A2 | 12/2004 |
| EP | 2421304 A1 | 2/2012 |
| WO | 200163843 A1 | 8/2001 |
| WO | 2004031488 A1 | 4/2004 |

OTHER PUBLICATIONS

European Search Report & Written Opinion for EP patent application # 12196947.1-1854, Feb. 7, 2013.

* cited by examiner

*Primary Examiner* — San Htun
*Assistant Examiner* — Erica Navar
(74) *Attorney, Agent, or Firm* — Perry + Currier Inc.

(57) ABSTRACT

In one illustrative example, a wireless device receives a communication policy from a private network. The communication policy includes allowable service provider identifiers (e.g. domain names, realms) corresponding to allowable service providers. The wireless device stores these identifiers in its memory. When roaming, the wireless device encounters a wireless network ("hotspot") and receives via the wireless network one or more reachable service provider identifiers corresponding to one or more reachable service providers. In a work mode of operation, the wireless device allows a connection to the wireless network based on a match between one of the allowable and reachable service provider identifiers, but otherwise disallows the connection. The communication policy may additionally or alternatively include device types for P2P networks, and/or allowable private network identifiers (e.g. ESSIDs), and/or allowable hotspot aggregator service identifiers or names, for use in the work mode.

19 Claims, 8 Drawing Sheets

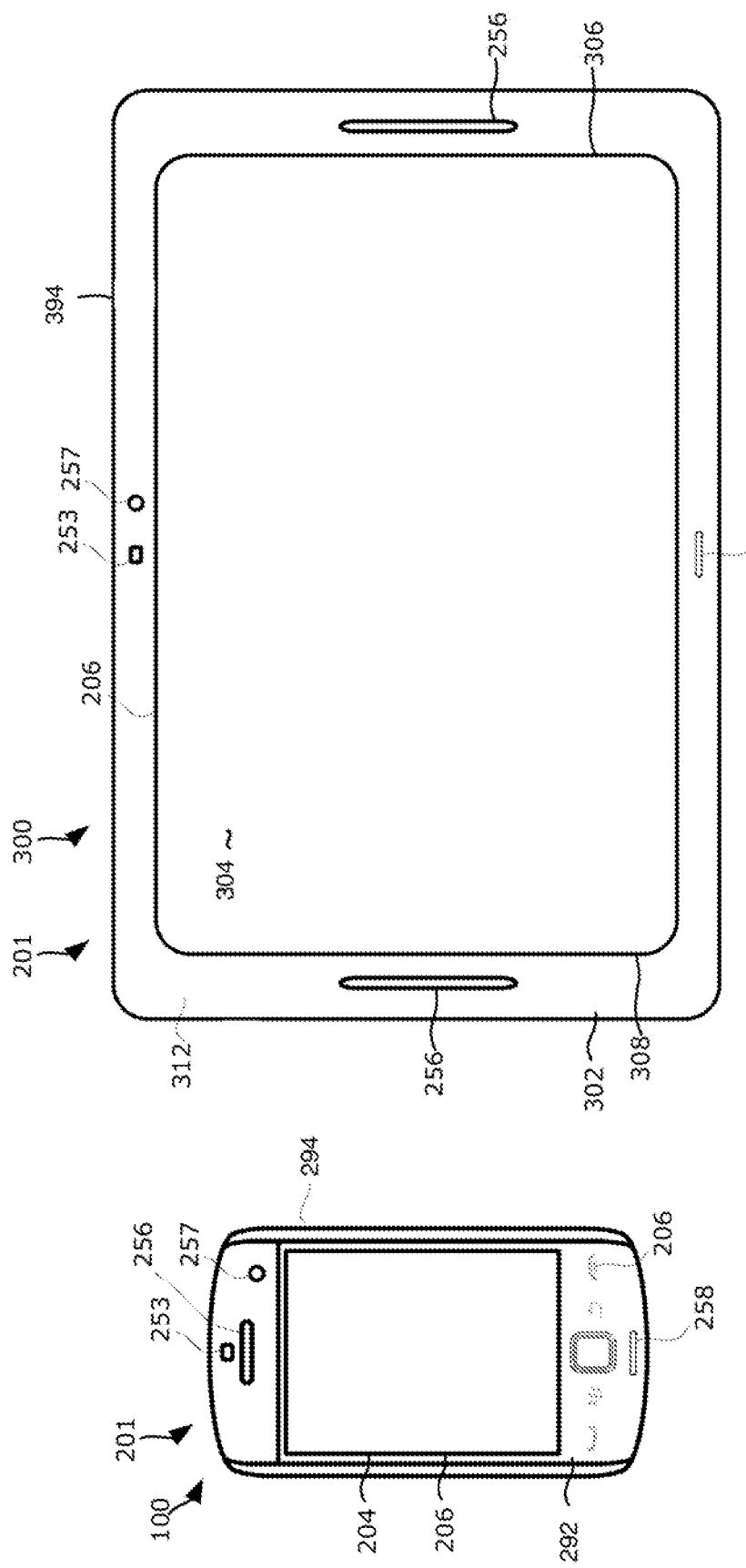

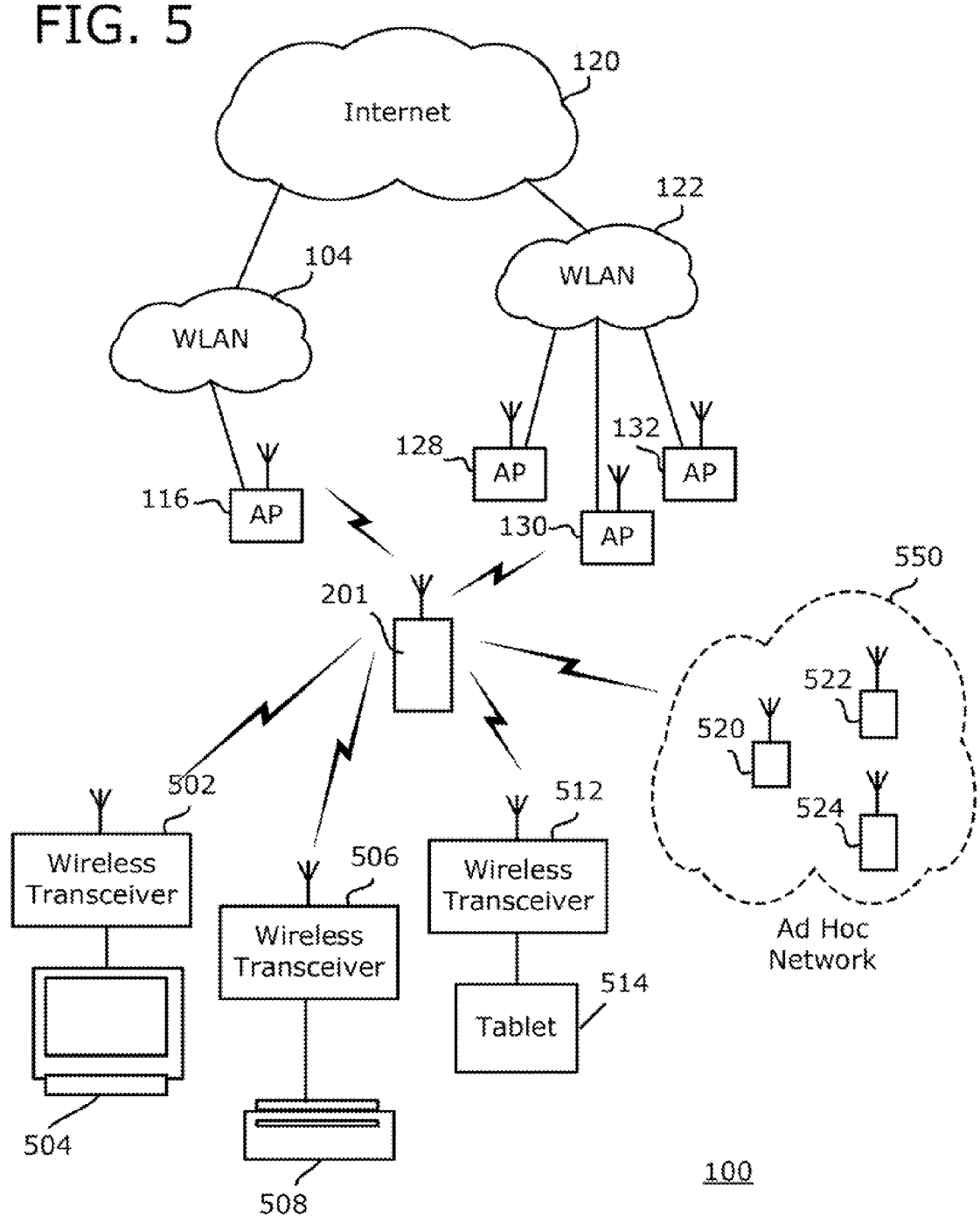

METHODS AND APPARATUS FOR USE IN CONTROLLING CONNECTIONS TO WIRELESS NETWORKS

BACKGROUND

1. Field Of The Technology

The present disclosure relates generally to techniques in devices which are configured for wireless communications, and more particularly to techniques far use in controlling connections to wireless networks for such devices.

2. Description Of The Related Art

A wireless communication device, such as a portable wireless telephony device or smartphone, may be configured to communicate in wireless communication networks. For example, such a device may communicate via access points (APs) of wireless local area networks (WLANs) in accordance with IEEE 802.11 standards or the like. The device may communicate in WLANs which are private WLANs of an enterprise or public WLANs such as hotspots. Such a device may additionally communicate using peer-to-peer communication techniques, for example, being certified as a "Wi-Fi Direct" device in accordance with the Wi-Fi Peer-To-Peer (P2P) Technical specification.

There is a need for efficiently controlling connectivity to such wireless networks in these and similar environments.

BRIEF DESCRIPTION OF THE DRAWINGS

Embodiments of present disclosure will now be described by way of example with reference to attached figures, wherein:

FIGS. 3 and 4 are some examples of different types of wireless devices of the present disclosure, which include a smartphone (FIG. 3) and a tablet computer (FIG. 4);

FIG. 5 is an illustration representation of a part of the communication system of FIG. 1 with different types of wireless networks, including different types of Wi-Fi peer-to-peer (P2P) wireless networks associated with different applications;

DETAILED DESCRIPTION OF THE PREFERRED EMBODIMENTS

Methods and apparatus for controlling connectivity to wireless networks are described. In one illustrative example, a wireless device receives a communication policy from a private network. The communication policy includes a list of one or more allowable service provider identifiers corresponding to one or more allowable service providers, The allowable service provider identifiers may include, for example, one or more Passpoint realms. The wireless device stores these allowable service provider identifiers in memory, While roaming, the wireless device receives via a wireless network (a "hotspot") one or more reachable service provider identifiers corresponding to one or more reachable service providers which provide service via the wireless network. In a first ("work") mode of operation, the wireless device allows a connection to the wireless network for communications based on identifying a match between one of the first service provider identifiers and one of the reachable service provider identifiers, but otherwise disallows the connection. In a second ("personal") mode of operation, the wireless device allows a connection to any suitable network, or alternatively to a wireless network based on identifying a match between a second service provider identifier stored in memory and one of the reachable service provider identifiers.

In another illustrative example, the communication policy may include a list of one or more allowable device types for peer-to-peer (P2P) wireless network communications. The wireless device stores in memory the one or more allowable device types. Then, the wireless device receives a device type from and corresponding to a P2P device. The wireless device allows a connection with the P2P device based on identifying a match between one of the allowable device types and the device type received from the P2P device. On the other hand, the wireless device disallows a connection with the P2P device based on identifying that none of the allowable device types match the device type received from the other wireless device. In this technique, the wireless device may operate in a first ("work") mode of operation. In a second ("personal") mode of operation, the wireless device allows a connection with any suitable P2P device, or alternatively based on identifying a match between one or more other allowable device types and the device type received from the other wireless device.

Figure 1:
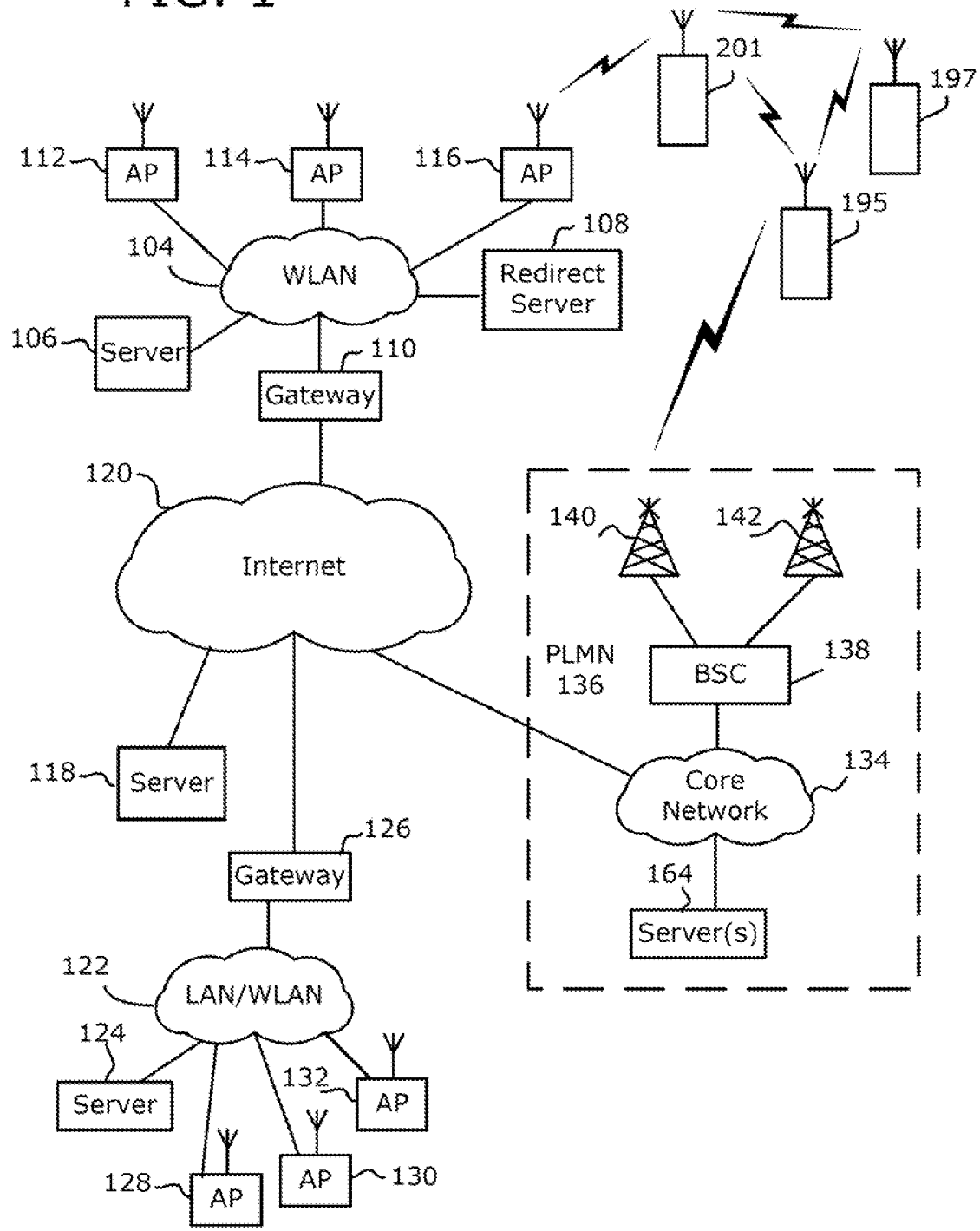
FIG. 1 is an illustrative representation of a communication system which includes wireless communication networks (e.g. WLANs) through which a wireless communication device may communicate.

Example Environment. To illustrate one environment within which the techniques of the present disclosure may be practiced, FIG. 1 illustrates a wireless communication device 201 which may communicate in a communication system 100. In the communication system 100, wireless device 201 may communicate with one or more wireless communication networks. For example, wireless device 201 may communicate with a wireless communication network 104 which is a wireless local area network (WLAN). Here, wireless network 104 and wireless device 201 may operate in accordance with IEEE 802.11 standards.

In this example, wireless network 104 has a plurality of wireless access points (APs) 112, 114, and 116 for wireless communications with wireless device 201. WLANs may be identified by a wireless device 201 with use of a wireless network identifier which is communicated from the WLAN. The wireless network identifier may be, for example, a Set Service Identifier (SSID) or Extended SSID (ESSID). In this example, wireless network 104 includes one or more servers 106, a redirect server 108, and a gateway 110. Server 106 may provide data, applications, and/or functionality for communication services for wireless device 201.

Wireless network 104 may be a public Wi-Fi "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to wireless device 201 to provide data for producing information (e.g. Web page information) which is rendered in a visual display of wireless device 201 via a Web browser application. The information may solicit a user response. For example, the information may solicit a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Wireless device 201 may also operate for communications in other different wireless networks, such as a wireless network 122 which is also a WLAN. In this example, wireless network 122 is a private communication network of an enterprise (e.g. an organization, a company, a corporation, etc.) of wireless device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120, gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, wireless device 201 may be enabled to maintain data synchronization with a server (e.g. server 106) for user data of an application associated with a user account. The application of wireless device 201 and the server may be or include, for example, an electronic mail (e-mail) application program for the communication of e-mail messages.

Wireless device 201 may be additionally configured to access communication services via a Public Land Wireless Network (PLMN) 136 (e.g. a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, wireless device 201 may be configured in accordance with one or more cellular telecommunication standards, such as Global Systems for Mobile (GSM) and/or General Packet Radio Service (GPRS) technologies. However, such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Further, in additional to being operative for communications with infrastructure WLANs (e.g. IEEE 802.11 infrastructure WLANs), wireless device 201 additionally or alternatively communicates using peer-to-peer communication techniques, for example, in accordance with the Wi-Fi Peer-To-Peer (P2P) Technical specification, and/or be certified as a "Wi-Fi Direct" device.

Accordingly, illustrating further in FIG. 1, wireless device 201 and one or more other wireless devices 195 and 197 in FIG. 1 may be operative to establish Wi-Fi P2P wireless network connections with each other in a Wi-Fi P2P wireless network. Here, one of the communicate devices may be configured to enter into an AP mode of operation, so that other communication devices may associate with them for direct RF communications therebetween. An AP mode of operation, which may be referred to as a "wireless AP mode" or the like, provides a benefit due to the high data rates available over MAN links. Here, again, data may be communicated directly between the wireless devices without the data traversing any wireless network infrastructure, where one of the devices is set to operate or serve as an AP (switching operation from as an end terminal) and the other device operates as an end terminal to associate and connect with the AP (i.e. wireless device 201 operating as an AP) for communications. Wireless device 201 may operate such that, when in the AP mode of operation with other communication devices 195 and 197, it also operates as a client with another AP.

Figure 2:
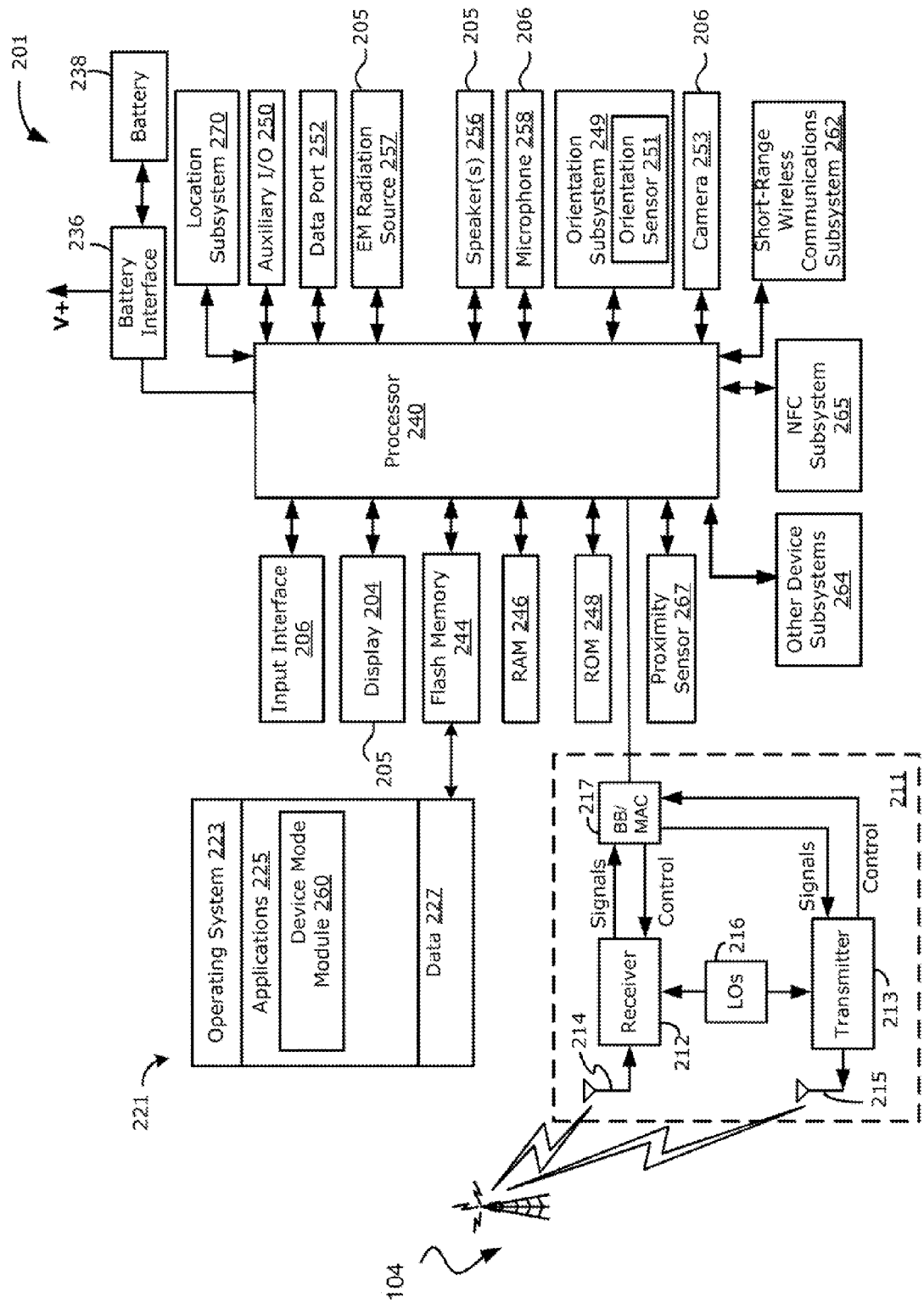
FIG. 2 is an example of a schematic block diagram of a wireless communication device.

Reference will now be made to FIG. 2 which illustrates one example of a schematic block diagram of wireless device 201. In the illustrated example, wireless device 201 is a communication device and, more particularly, is a mobile communication device having data and voice communication capabilities, and configured to communicate with other computer systems (e.g., via the Internet). It will, however, be appreciated that wireless device 201 may take other forms.

Depending on the functionality provided by wireless device 201, in various examples, wireless device 201 may be a multiple-mode communication device configured for both data and voice communication, a mobile telephone, such as a smartphone, a wearable computer such as a watch, a tablet computer such as a slate computer, a personal digital assistant (PDA), or a computer system. Wireless device 201 may take other forms apart from those specifically listed above. The electronic device may also be referred to as a mobile communications device, a communication device, a mobile device and, in some cases, as a device.

Wireless device 201 includes a controller including one or more processors 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch-screen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NEC) subsystem 265, a short-range wireless communication subsystem 262 and other device subsystems generally designated as 264. Some of the subsystems shown in FIG. 2 perform communication-related functions, whereas other subsystems may provide "resident" or on-device functions.

In at least some examples, wireless device 201 may include a touchscreen display which acts as both an input interface 206 (I.e., touch-sensitive overlay) and an output interface 205 (i.e., display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some examples, the touch-sensitive overlay may have a touch-sensitive input surface which is larger than the display 204. For example, in at least some examples, the touch-sensitive overlay may extend overtop of a frame 312 (of FIG. 3) which surrounds the display 204. In such example, the frame 312 (of FIG. 3) may be referred to as an active frame since it is capable of acting as an input interface 206. In at least some examples, the touch-sensitive overlay may extend to the sides of wireless device 201.

As noted above, in some examples, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at least some examples, wireless device 201 may communicate with any one of a plurality of stations or access points (APs) of wireless network 104 within its geographic coverage area. Wireless device 201 may send and receive communication signals over wireless network 104 after the required network registration or activation procedures have been completed, Signals received by the antenna 214 through wireless network 104 are input to the receiver 212, which may perform such common receiver functions as signal amplification, frequency down conversion, filtering, channel selection, etc., as well as analog-to-digital (A/D) conversion, A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some examples, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown), The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some examples, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some examples, the orientation sensor 251 is an accelerometer, such as a three-axis accelerometer. An accelerometer is a sensor which converts acceleration from motion (e.g., movement of the device 201 or a portion thereof due to the strike force) and gravity which are detected by a sensing element and converted into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some examples, specifies the orientation of the device 201 relative to the gravitational field of the earth.

In some examples, the orientation subsystem 249 may include other orientation sensors 251, instead of or in addition to accelerometers. For example, in various examples, the orientation subsystem 249 may include a gravity sensor, a gyroscope, a tilt sensor, an electronic compass or other suitable sensor, or combinations thereof. In some examples, the device orientation subsystem 249 may include two or more orientation sensors 251 such as an accelerometer and an electronic compass.

Wireless device 201 may, in at least some examples, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some examples, wireless device 201 may include a plurality of speakers 256. For example, in some examples, wireless device 201 may include two or more speakers 265. The two or more speakers 256 may, for example, be disposed in spaced relation to one another. That is, in at least some examples, wireless device 201 may include a first speaker and a second speaker and the first speaker and the second speaker may be spatially separated from one another within wireless device 201. In at least some examples, the display 204 may be disposed between the first speaker and the second speaker of the electronic device. In such example, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some examples, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some examples, wireless device 201 includes a front facing camera 253. A front facing camera 253 is a camera which is generally located on a front face of wireless device 201. The front face is typically the face on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. Alternatively, or additionally, camera 253 may be located on a rear face of wireless device 201. The camera 253 may be a fixed position camera which is not movable relative to the display 204 of wireless device 201 and/or the housing of wireless device 201. In such examples, the direction of capture of the camera is always predictable relative to the display 204 and/or the housing. In at least some examples, the camera may be provided in a central location relative to the display 204 to facilitate image acquisition of a face.

In at least some examples, wireless device 201 includes an electromagnetic (EM) radiation source 257. In at least some examples, the EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, in at least some examples, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some examples, the electromagnetic radiation source 257 may be an infrared (IR) radiation source which is configured to emit infrared radiation. In at least some examples, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some examples, the camera 253 is configured to capture at least some electromagnetic radiation which is not in the visible spectrum.

In some examples, wireless device 201 is provided with a service routing application programming interface (API) which provides an application with the ability to route traffic through a serial data (i.e., USB) or BLUETOOTH® (BLUETOOTH® is a registered trademark of Bluetooth SIG, Inc.) connection to a host computer system using standard connectivity protocols. When a user connects their wireless device 201 to the host computer system via a USB cable or BLUETOOTH® connection, traffic that was destined for wireless network 104 is automatically routed to wireless device 201 using the USB cable or BLUETOOTH® connection. Similarly, any traffic destined for wireless network 104 is automatically sent over the USB cable BLUETOOTH® connection to the host computer system for processing.

Wireless device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some examples, be a wireless device which is the same or similar to wireless device 201 discussed with reference to FIG. 1. in at least some examples, the short-range communication subsystem 262 is a wireless bus protocol compliant communication mechanism such as a BLUETOOTH® communication module to provide for communication with similarly-enabled systems and devices.

Wireless device 201 stores data 227 in an erasable persistent memory, which in one example is the flash memory 244. In various examples, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g., flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some examples, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 2, the software modules 221 include operating system software 223 and other software applications 225 such as device mode module 260. In the example of FIG. 2, the device mode module 260 is implemented as a stand-alone application 225. However, in other examples, the device mode module 260 could be implemented as part of the operating system 223 or another application 225.

The software applications 225 on wireless device 201 may also include a range of additional applications, including for example, a notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (e.g., the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e., the flash memory 244), or written into and executed from the RAM 246 for execution by the processor 240 at runtime.

Example Smartphone Electronic Device. Referring now to FIG. 3, a front view of an example wireless device 201 which is a smartphone 300 is illustrated. The smartphone 300 is a mobile phone which offers more advanced computing capability than a basic non-smartphone cellular phone. For example, the smartphone 300 may have the ability to execute third party applications which are stored on the smartphone.

The smartphone 300 may include the components discussed above with reference to FIG. 2 or a subset of those components. The smartphone 300 includes a housing 294 which houses at least some of the components discussed above with reference to FIG. 2.

In the example illustrated, the smartphone includes a display 204, which may be a touchscreen display which acts as an input interface 206. The display 204 is disposed within the smartphone 300 so that it is viewable at a front side 292 of the smartphone 300. That is, a viewable side of the display 204 is disposed on the front side 292 of the smartphone. In the example illustrated, the display 204 is framed by the housing 294.

The example smartphone 300 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example illustrated, the smartphone includes a single speaker 256 which is disposed vertically above the display 204 when the smartphone 300 is held in a portrait orientation where its height is longer than its width. The speaker 256 may be disposed on the front face of the smartphone 300.

While the example smartphone 300 of FIG. 3 includes a single speaker 256, in other examples, the smartphone 300 may include a greater number of speakers 256. For example, in at least some examples, the smartphone 300 may include a second speaker 256 which is disposed vertically below the display 204 when the smartphone is held in a portrait orientation where its height is longer than its width (i.e., the orientation illustrated in FIG. 3).

The example smartphone 300 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 300 also includes a front facing camera 253 which may be located vertically above the display 204 when the smartphone 300 is held in a portrait orientation where its height is longer than its width. The front facing camera 253 is located so that it may capture images of objects which are located in front of and/or surrounding the front side of the smartphone 300.

The example smartphone 300 also includes an electromagnetic radiation source 257. The electromagnetic radiation source 257 is disposed on the front side 292 of the smartphone 300. In this orientation, electromagnetic radiation which is produced by the electromagnetic radiation source 257 may be projected onto objects which are located in front of and/or surrounding the front side of the smartphone 300. Such electromagnetic radiation (or the projection of electromagnetic radiation onto objects) may be captured on images obtained by the camera 253.

Example Tablet Electronic Device. The wireless device may be a tablet computer 400 (tablet)), one of which is illustrated in FIG. 4. Tablet computer 400 of FIG, 4 may include many of the same features and components of the smartphone 300 of FIG. 3. However, tablet computer 400 of FIG. 4 is generally larger than the smartphone 300 of FIG. 3. Tablet computer 400 may include the components discussed above with reference to FIG. 2 or a subset of those components.

Tablet computer 400 includes a housing 394 which houses at least some of the components discussed above with reference to FIG. 2.

Tablet computer 400 includes a display 304, which may be a touchscreen display which acts as an input interface 206. The display 304 is disposed within tablet computer 400 so that it is viewable at a front side 302 of tablet computer 400. That is, a viewable side of the display 304 is disposed on the front side 302 of tablet computer 400. In the example illustrated, the display 304 is framed by the housing 394, with use of a frame 312 which surrounds the display 304. The frame 312 is portion of the housing 394 which provides a border around the display 304. In at least some examples, the frame 312 is an active frame 312. That is, the frame has a touch sensitive overlay which allows wireless device 201 to detect a touch applied to the frame, thereby allowing the frame 312 to act as an input interface 206 (of FIG. 2).

The example tablet computer 400 includes a plurality of speakers 256. In the example illustrated, the tablet includes two speakers 256. The two speakers 256 are disposed on opposing sides of the display 304. More particularly, when tablet computer 400 is held in a landscape orientation (such as the orientation illustrated in FIG. 4) where its width is longer than its height, one of the two speakers is disposed on a right side 306 of the display 304 and one of the speakers is disposed on the left side 308 of the display 304. Both speakers 256 are disposed on the front side 302 of tablet computer 400.

The example tablet computer 400 also includes a microphone 258. In the example illustrated, the microphone 258 is vertically disposed below the display 304 when the tablet computer is held in the landscape orientation illustrated in FIG. 4. The microphone 258 may be located in other locations in other examples.

The example tablet computer 400 also includes a front facing camera 253 which may be located vertically above the display 304 when tablet computer 400 is held in a landscape orientation (i.e., the orientation of FIG. 3). The front facing camera 253 is located so that it may capture images of objects which are located in front of and/or surrounding the front side of tablet computer 400.

The example tablet computer 400 also includes an electromagnetic radiation source 257. The electromagnetic radiation source 257 is disposed on the front side 304 of tablet computer 400. In this orientation, electromagnetic radiation which is produced by the electromagnetic radiation source 257 may be projected onto objects which are located in front of and/or surrounding the front side 302 of tablet computer 400. Such electromagnetic radiation (or the projection of electromagnetic radiation onto objects) may be captured on images obtained by the camera 253.

Although a specific wireless device has just been described, any suitable wireless communication device or terminal may be part of the methods and apparatus which will be described in fuller detail below. Also, although the description of the architecture relates to a specific example for illustration, where the wireless network or WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Example Wireless Network Configurations/Connections. FIG. 5 is an illustrative representation of a part of the communication system 100 of FIG. 1, which illustrates different types of wireless network configurations which may involve wireless device 201. Wireless networks 104 and 122 are WLANs of the traditional "WLAN infrastructure" type, which typically provide for external network connectivity, as described earlier in relation to FIG. 1. For example, wireless networks 104 and 122 are configured to provide or facilitate access to the Internet 120 (or other communication network, such as a public communication network) for wireless device 201 when connected therewith. In this case, wireless device 201 may make use of its WLAN profiles for connecting with such WLANs.

Other wireless networking configurations include Wi-Fi peer-to-peer (P2P) wireless networking configurations. For example, in FIG. 5 it is shown that wireless device 201 may establish a Wi-Fi P2P wireless connection with a display device 504 (or monitor) which includes a wireless transceiver 502. Such Wi-Fi P2P wireless network connection may be suitable for applications such as, for example, a streaming media application, or a display or presentation application.

It is also shown that wireless device 201 may establish a Wi-Fi P2P wireless network connection with a printer device 508 which includes a wireless transceiver 505. Such Wi-Fi P2P wireless network connection may be suitable for applications such as, for example, a print application or a facsimile application.

Even further, it is shown that wireless device 201 may establish a Wi-Fi P2P wireless network connection with a tablet 514 which includes a wireless transceiver 512. An example tablet was previously shown and described in relation to FIG. 4. Such Wi-Fi P2P wireless network connection may be suitable for an applications such as, for example, a "bridge" or "bridging" application, where wireless device 201 is further configured for cellular telecommunications (e.g. equipped with a cellular transceiver) but tablet 514 is not. In such application, tablet 514 is able to achieve external network (e.g. Internet) connectivity, being connected to wireless device 201 for communications via the cellular telecommunication network.

It is further shown in FIG. 5 that wireless device 201 may establish a Wi-Fi P2P wireless network connection in an ad hoc wireless network 550 which includes one or more other wireless devices 520, 522, and 524. Such Wi-Fi P2P wireless network connection may be suitable for applications such as, for example, a file sharing application, a conference meeting application, a remote control application, or a game or gaming application. In many instances, such ad hoc wireless networks provide no external network connectivity.

When wireless device 201 is connected as such, using one or more Wi-Fi P2P wireless network connections, data may be communicated "directly" between wireless device 201 and the other devices (I.e. without the data traversing any fixed wireless network infrastructure).

Profiles For Applications Which Make Use Of Wi-Fi P2P Wireless Connections. As described earlier, wireless device 201 has different types of applications stored therein. These applications may include, as examples, a messaging application, a voice telephony application, a Web browsing application, a streaming media application, a file sharing application, a game application, a printer application, a facsimile application, a display or presentation application, a military application, as examples. Wireless device 201 is optimized to establish the appropriate wireless networks based on which type of application is invoked.

Figure 6:
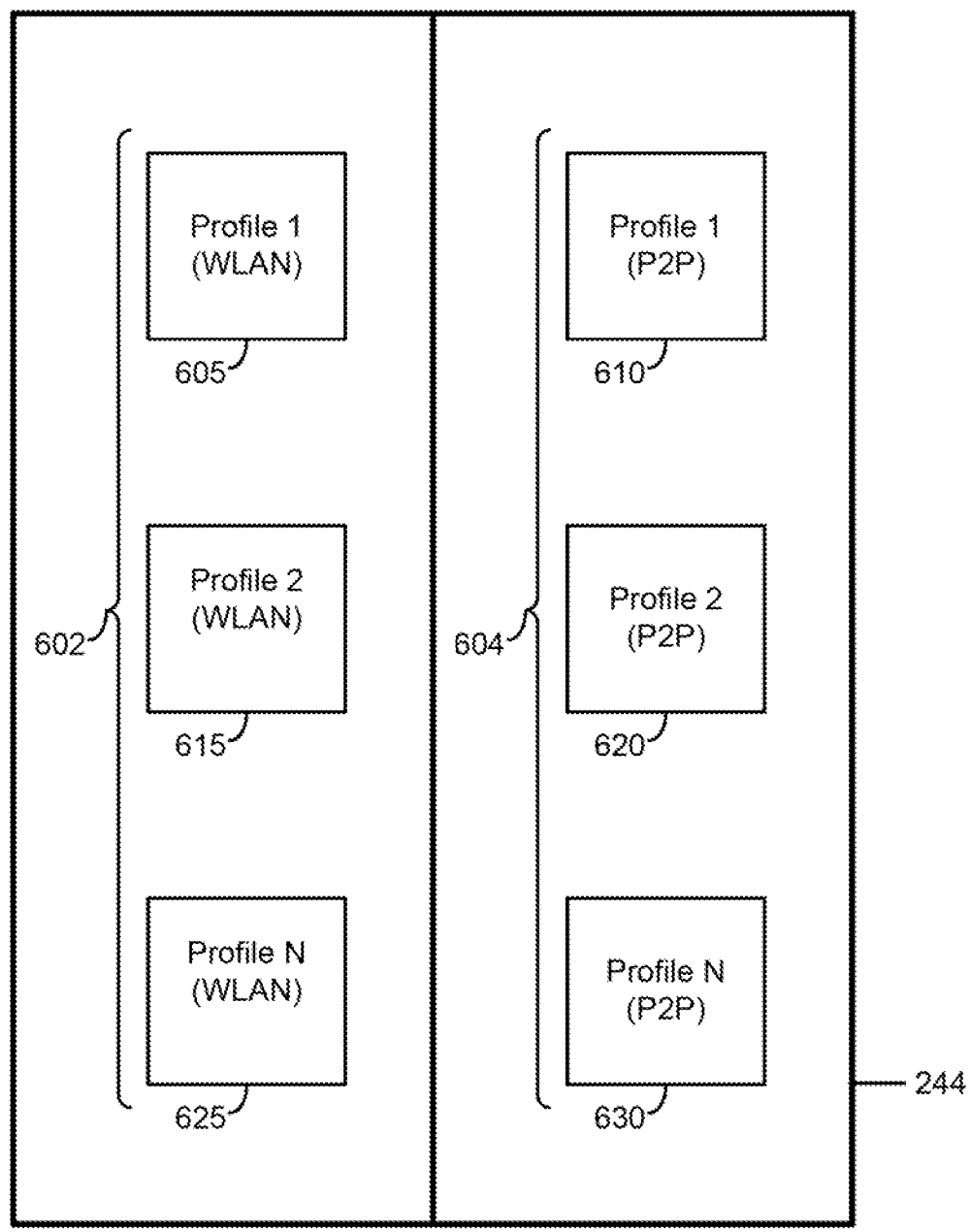
FIG. 6 is an illustrative representation of a portion of memory which includes a plurality of profiles, including profiles associated with applications and/or services which may make use of WLAN profiles, Wi-Fi P2P network profiles, or both.

Referring ahead to FIG. 6, an illustrative representation of another portion of memory 224 of wireless device 201 is shown. Memory 224 is shown to store a plurality of profiles for wireless networking. The profiles include one or more profiles 602 associated with WLAN infrastructure networks, and/or one or more profiles 604 associated with applications and/or services which utilize Wi-Fi P2P wireless network connections. In FIG. 6, profiles 602 are shown to include profiles 605, 615, and 625, whereas profiles 604 are shown to include profiles 610, 620, and 630. Profiles 602 may be or be referred to as WLAN profiles, whereas profiles 604 may be or be referred to as Wi-Fi P2P wireless networking profiles or Wi-Fi Direct profiles.

Each one of profiles 602 is associated with a particular WLAN infrastructure network, and includes a plurality of parameters and/or properties for accessing the particular MAN. The WLAN information may include an identification which identifies the WLAN (e.g. a SSID or ESSID). The WLAN information may also include authentication and/or security information for obtaining access to the WLAN (e.g. a network key, passkey, security key, etc.), One of the WLANs appropriate WLAN from profiles 602 will be selected for communication when available, as prioritized in a prioritized list of the profiles 602. When not connected in a WLAN, the wireless device normally operates to search for WLANs identified in its stored profiles 602. conversely, the wireless device normally refrains from searching for and communicating in WLANs other than those WLANs identified in stored profiles 602.

On the other hand, each one of profiles 604 is associated with one of the applications and/or services which utilizes a particular type and/or configuration of Wi-Fi P2P wireless network (or Wi-Fi Direct network). Each one of profiles 604 includes parameters and/or properties associated with establishing the particular type and/or configuration of Wi-Fi P2P wireless network for the application and/or service. Profiles 604 may be created, viewed, updated, enabled, and disabled.

Properties in profiles 604 may include the following. Properties may include a device type property which indicates a device type of the device for the Wi-Fi P2P wireless network connection to be established. The device type may be the device type that is being searched for in the discovery. Note that there may be two device types specified in the profile: a primary device type and a secondary device type. The device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The device type may be or include category identification (ID) and/or subcategory identification (ID). Examples of such types are as follows: a computer, an input device, a printer, a camera, a display (monitor), a gaming device, an audio device, a multimedia device, or a telephone device.

Properties may additionally or alternatively include an advertised device type property which indicates the device type of wireless device 201. The advertised device type may be the device type to be advertised by wireless device 201. Note that there may be two advertised device types specified in the profile: a primary advertised device type, and a secondary advertised device type. The advertised device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The advertised device type may be or include category identification (ID) and/or subcategory identification (ID). Examples of such types are as follows: a computer, an input device, a printer, a camera, a display (monitor), a gaming device, an audio device, a multimedia device, or a telephone device.

Properties in profiles 604 may additionally or alternatively include a service type property which indicates a service type which identifies the service associated with the device. For example, the service types may be or include the appropriate service types as described in the Wi-Fi Peer-To-Peer (P2P) Technical specification (e.g. in Annex E thereof). Examples of such types are as follows: a file sharing service, or a printing service. Alternatively, examples of such types are as follows: Apple File Sharing (AFP) service (or AFP over TCP service), or IP Printing (IPP) Bonjour service.

Properties in profiles 604 may additionally or alternatively include a discovery mode property which indicates a mode utilized for the discovery of devices for the Wi-Fi P2P wireless network connection. The discovery mode property may be set to one of the following: a triggered mode of discovery, or a periodic mode of discovery. Alternatively, the discovery mode may be set to one of the following: a triggered mode of discovery, a periodic mode of discovery, or a Group Owner (GO) mode of discovery.

Properties in profiles 604 may additionally or alternatively include a persistent property or indication which indicates whether or not the Wi-Fi P2P wireless network is persistent. If the network is persistent, when an application is opened or activated, the wireless device connects to a previously-established Wi-Fi P2P wireless network.

Properties in profiles 604 may additionally or alternatively include a coexistence indication or property which indicates whether the Wi-Fi P2P wireless network connection associated with this profile may be maintained while the wireless device operates as a client in an infrastructure network. Properties may additionally or alternatively include another coexistence indication or property which indicates whether the Wi-Fi P2P wireless network connection associated with this profile may be maintained while maintaining another Wi-Fi P2P wireless network connection.

Properties in profiles 604 may additionally or alternatively include an application name is the name of the application associated with the profile. Relatedly, properties in profiles 604 may additionally or alternatively include an application link or address pointer to the application in memory of the wireless device.

Figure 7:
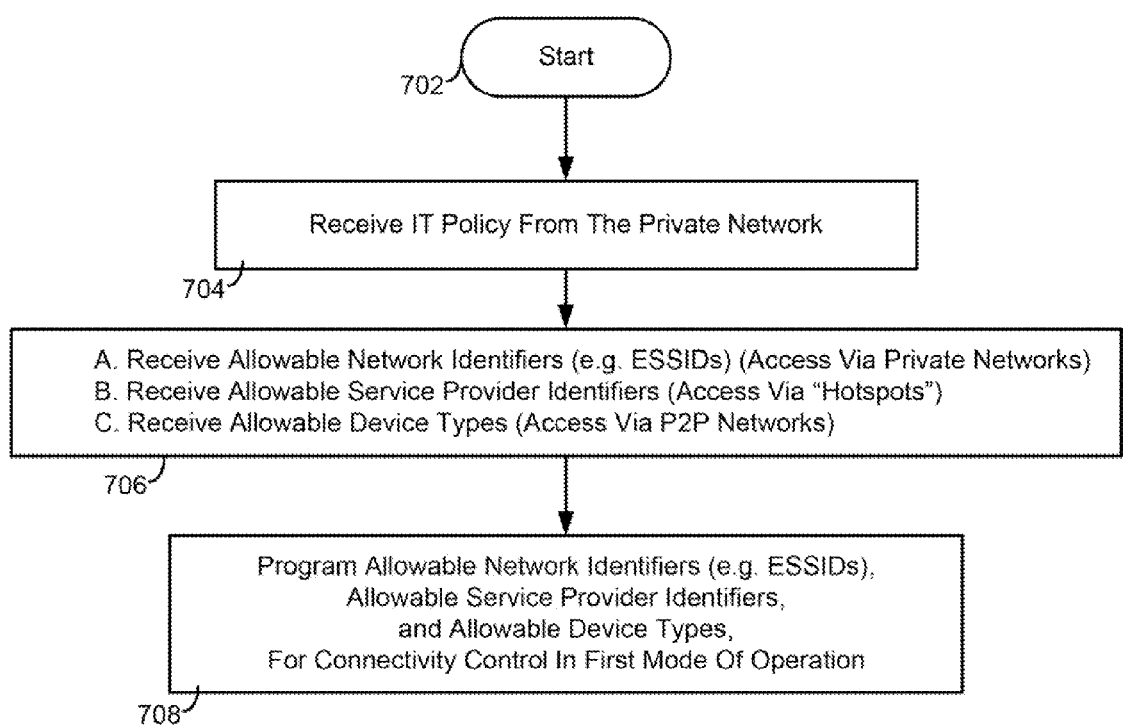
FIG. 7 is a flowchart for describing a first part of a method for use in controlling connections to wireless networks.
Figure 8:
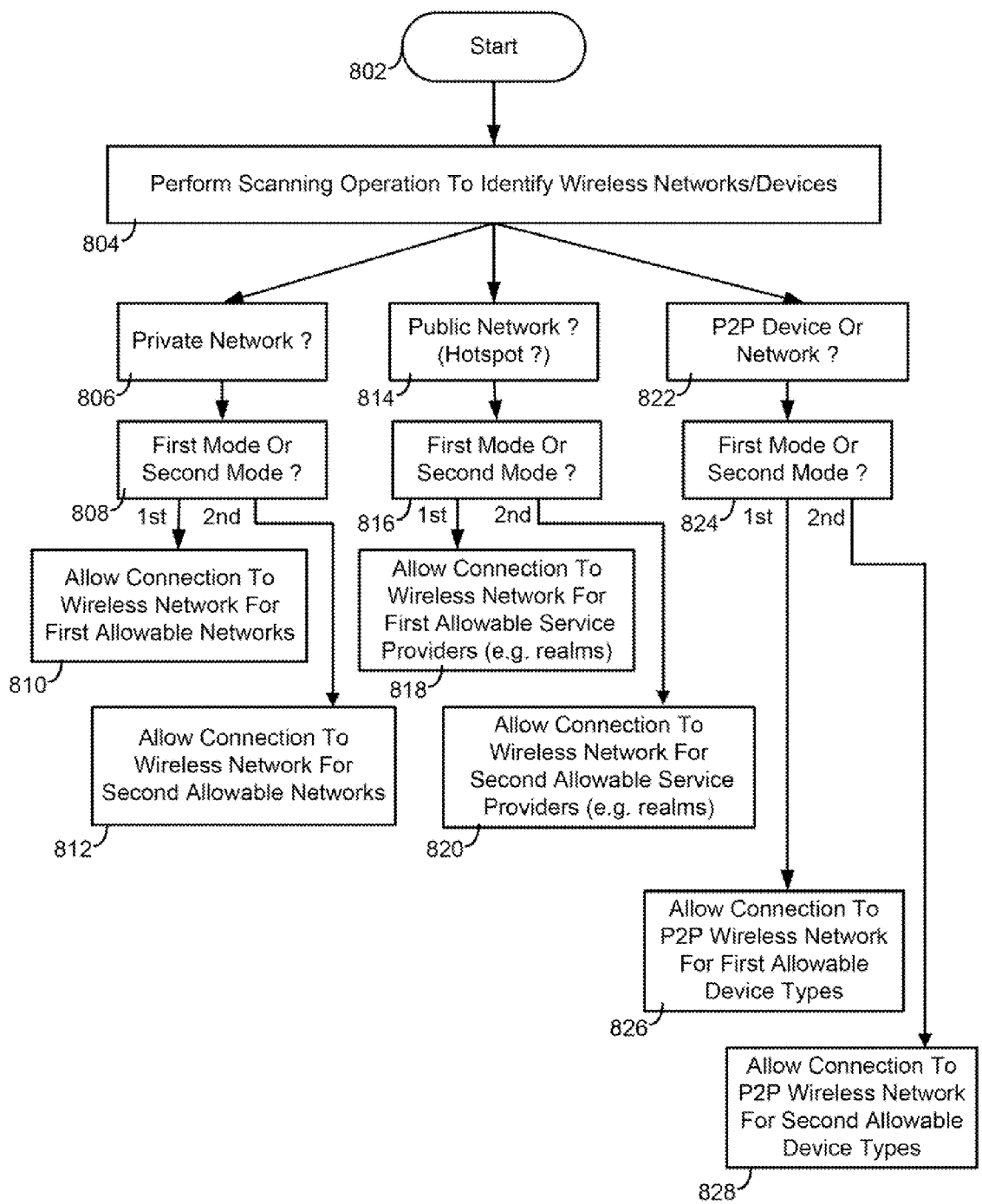
FIG. 8 is a flowchart for describing a second part of the method for use in controlling connections to wireless networks.

FIGS. 7-8 are flowcharts which describe a method for use in controlling connectivity to wireless networks of the present disclosure. FIG. 7 is a first part of the method, and FIG. 8 may be a second part of the method which follows the first part. Although the flowcharts of FIGS. 7 and 8 are described as two different parts of the same method, they may be described as separate methods. The methods may be performed by wireless device 201 described in relation to FIGS. 1-6. In particular, the techniques described may be performed by one or more controllers or processors of the wireless device along with its wireless or RF transceiver. A computer program product which may embody the technique may include a computer readable medium (e.g. memory of the communication device, computer disk, CD-ROM, etc.) having computer instructions stored therein which are executable by the one or more processors of the wireless device for performing the technique.

Figure 9:
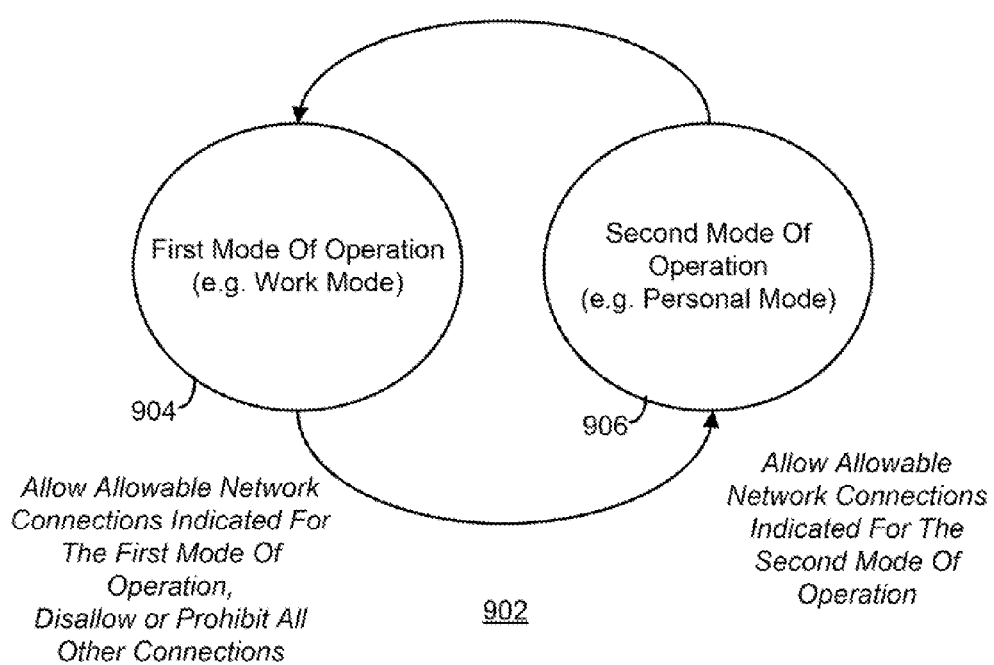
FIG. 9 is a simple state diagram for operating the wireless device in a first mode of operation (e.g. work mode) or a second mode of operation (e.g. personal mode).

In general, the wireless device which performs the technique of FIGS. 7-8 is configured to operate as shown in the simple state diagram of FIG. 9, in either a first mode of operation 904 or a second mode of operation 906. The first mode of operation 904 may be a work mode of operation, and the second mode of operation 906 may be a personal mode of operation. In some embodiments, the first and second modes of operation 904 and 906 are mutually exclusive modes of operation. In the first mode of operation 904, the wireless device operates to allow allowable network connections indicated for the first mode of operation, and disallows or prohibits most if not all other connections. In the second mode of operation 906, the wireless device may operate to allow allowable network connections indicated for the second mode of operation. The user interface of the wireless device may provide a setting for the user to select one of these operating modes 904 or 906. Additionally or alternatively, applications may be associated with the first or the second mode of operation and, upon its execution, the appropriate operating mode is established.

Referring now to FIG. 7 at a start block 702, the wireless device receives an IT policy from a private (e.g. enterprise) network (step 704 of FIG. 7). The private network may include one or more wireless networks associated with and/or operating by an enterprise (e.g. an organization, a company, a corporation, etc.) associated with the wireless device and/or the user thereof. For example, see e.g. the discussion in relation to WLAN 122 of FIG. 1. The wireless device may receive the IT policy wirelessly via the wireless network, or alternatively over a wired connection with a computer of the private network, as a few examples.

In general, an IT policy defines the permissions, restrictions, and/or limitations for communications or connections of a communication device. Such permissions, restrictions, and/or limitations may be based on a policy of a group, entity, or enterprise. The IT policy may be more generally referred to as a communication policy, or simply just a policy. Policy data is or includes data of the policy which controls, permits, restricts, and/or limits the communications or connections. The policy data is programmed in the communication device to maintain such control, control that (typically) cannot be overridden by the user.

In particular, the IT policy may include a list of one or more allowable network identifiers corresponding to one or more allowable wireless networks to select for connection in the first mode of operation (step 706A of FIG. 7). These allowable network identifiers may be or include allowable service set identifiers (SSIDs) or extended SSIDs (ESSIDs) which identify allowable (private) WLANs (e.g. of an enterprise). Each identifier may be associated with WLAN profile information which is also received in the IT policy. That is, the IT policy includes one or more WLAN profiles corresponding to allowable wireless networks to connect to in the first mode of operation, where each WLAN profile includes an allowable network identifier (e.g. SSID, ESSID). See e.g. the discussion in relation to profiles 602 of FIG. 6.

When programmed in the memory of the wireless device, WLAN profiles for use in the first ("work") mode of operation may be marked with an indication (e.g. an indicator bit) to identify whether the WLAN is for use in the first mode of operation. WLAN profiles for use in the second mode of operation, which may be programmed using techniques other than IT policy control, are not marked with such indication, or may be marked with an indication for use in the second mode of operation.

Additionally, or alternatively, the IT policy may include a list of one or more allowable service provider identifiers corresponding to one or more allowable service providers to reach in public WLANs or "hotspots" in the first mode of operation (step 706B of FIG. 7). These allowable service provider identifiers may be or include allowable PLMN IDs, domain names, realms, Network Address Identifiers (NAIs) or NAI realms, etc.

Also additionally, or alternatively, the IT policy may include a list of one or more allowable device types to select for connection in peer-to-peer (P2P) networks in the first mode of operation (step 706C of FIG. 7). P2P capable devices advertise their device type during operation; some examples of device types are computers such as servers or PCs, input devices such as keyboards, printers, cameras, network infrastructure such as access points (APs), and telephones such as smartphones. As described earlier above, the device types may be or include the appropriate device types in the Wi-Fi Direct Network as described in the Wi-Fi Peer-To-Peer (P2P) Technical specification (e.g. in Annex B thereof). The device type may be or include a category identification (ID), a subcategory identification (ID), or both.

The wireless device programs the information from the IT policy in its memory, for use in connectivity control in the first mode of operation (step 708 of FIG. 7). In general, the allowable wireless network identifiers (e.g. allowable SSIDs or ESSIDs) will direct connections to allowable private (enterprise) WLANs, the allowable service provider identifiers (e.g. allowable realms) will direct connections to allowable hotspots, and the allowable device types will direct connections to allowable P2P networks.

The IT policy received in step 704 may include allowable service provider identifiers which may include allowable cellular operator identifiers (e.g. PLMN IDs), domain names, realms, or other suitable identifiers. A PLMN ID may be or include a combination of Mobile Country Code (MCC) and Mobile Network Code (MNC) corresponding to the provider. If the roaming partner for a hotspot is a cellular operator, it is identified by its MCC-MNC pair. Alternatively, a domain name or Network Address Identifier (NAI) may be utilized; the NAI realm, for example "attwireless.com'. Finally, the service provider identifiers may be or include Organizational Identifiers (OIs) for a Roaming Consortium (RC). An OI identifier uniquely identifies the organization or server provider. Service providers may register for an OI in a database maintained by the relevant associated organization.

In some embodiments, the allowable service providers for the first mode of operation are reachable in hotspots configured in accordance with a protocol for facilitating automated connection for service. In this case, the public WLANs may be "WiFi Passpoint Certified" in accordance with the Wi-Fi Alliance Passpoint certification or specification (e.g. the Wi-Fi Alliance Passpoint 2.0 Specification). The information in the IT policy may be set to limit the wireless device's selection of hotspots or service providers to those configured in accordance with the protocol for facilitating automated connection for service.

Note that for the second mode of operation, assuming that it is indeed a "personal" mode of operation, the user may have freedom to connect with any suitable network or device of his or her choice, not limited to the IT policy information. Alternatively, or additionally, the wireless device may store or program information in memory for use for the second mode of operation, similar to that described above in relation to FIG. 7. Thus, connections in the second mode of operation may be those based on other stored network identifiers (e.g. SSIDs, ESSIDs in other WLAN profiles), service provider identifiers, allowable device types for P2P networks or connections, or combinations of the above.

Referring now to FIG. 8, is a flowchart for describing the second part of the method for use in controlling connectivity to wireless networks. The second part of the method of FIG. 8 may be performed after the first part described above in relation to FIG. 7. The method of FIG. 8 may be performed by wireless device 201 described in relation to FIGS. 1-6. The techniques described in relation to the flowchart may be performed by one or more controllers or processors of the wireless device along with its wireless or RF transceiver. A computer program product which may embody the technique may include a computer readable medium (e.g. memory of the communication device, computer disk, CD-ROM, etc.) having computer instructions stored therein which are executable by the one or more processors of the wireless device for performing the technique.

Beginning at a start block 802 of FIG. 8, while roaming the wireless device performs scanning operations, or otherwise monitors or operates, to identify one or more wireless networks or devices in its geographic region (step 804 of FIG. 8). The wireless device may encounter one or more private (enterprise) networks (step 806 of FIG. 8), one or more public networks or "hotspots" (step 814 of FIG. 8), and/or one or more P2P devices or networks (step 822 of FIG. 8).

Here, the wireless device may scan in a passive mode or an active mode of operation. In the passive mode, the wireless device receives beacons from surrounding wireless networks, and these beacons include network identifiers (e.g. SSIDS, ESSIDs) which identify the networks. In the active mode, the wireless device sends probe requests and receives probe responses in response; these probe responses include the network identifiers which identify the networks. For hotspots, beacons and probe responses may also include reachable service provider identifiers which identify the reachable service providers via the networks. Note further that the wireless device may perform P2P discovery operations, such as operations in a scan phase or a find phase, etc., to identify one or more P2P networks or devices. The wireless device receives information from these P2P networks or devices, including a device type which identifies the type of device.

When the wireless device is considering private enterprise networks (step 806 of FIG. 8), the wireless device will scan for and connect with wireless networks that are suitable for and correspond to the first mode or the second mode of operation. As the wireless device may include WLAN profiles saved in its memory (see discussion in relation to FIG. 6), these profiles may correspond to the information received in the IT policy (see discussion in relation to step 704 of FIG. 7). Here, WLAN profiles for use in the first mode of operation may be marked with an indication which is indicative of use in the first mode of operation (e.g. an indicator bit). WLAN profiles for use in the second mode of operation are not marked with such indication, or may be marked with an indication which is indicative of use in the second mode of operation.

The wireless device identifies whether operating in the first mode or the second mode of operation (step 808 of FIG. 8). When in the first mode of operation, the wireless device allows a connection to a wireless network identified by a network identifier that matches an allowable network identifier associated with (indicated to be for) the first mode of operation (step 810 of FIG. 8). The wireless device disallows, prohibits, or otherwise fails to consider a connection to a wireless network identified by a network identifier that fails to match any of the allowable network identifiers. Conversely, when in the second mode of operation, the wireless device may allow any suitable connection; alternatively the wireless device allows a connection to a wireless network identified by a network identifier that matches an allowable network identifier associated with (and indicated to be for) the second mode of operation (step 818 of FIG. 8).

In some embodiments, the logic from steps 804, 808, 810, and 812 is combined such that the wireless device scans only for network identifiers that are indicated to be for (e.g. in or associated with the corresponding WLAN profile) the first mode of operation. If the scanning operation is limited to such networks, then the wireless device will fail to "see" and connect with those networks.

When the wireless device is considering public networks or hotspots (step 814 of FIG. 8), the wireless device will scan for and connect with hotspots that are suitable for and correspond to the first mode or the second mode of operation. The wireless device identifies whether it is operating in the first mode or the second mode of operation (step 816 of FIG. 8). When in the first mode of operation, the wireless device allows a connection to a hotspot which has a reachable service provider that matches an allowable service provider associated with (indicated to be for) the first mode of operation (step 818 of FIG. 8). The wireless device disallows prohibits, or otherwise fails to consider a connection to a wireless network having reachable service providers that fail to match any of the allowable network identifiers. Conversely, when in the second mode, the wireless device may allow a connection to any suitable wireless network; alternatively, the wireless device allows a connection to a wireless network having a reachable service provider that matches an allowable service provider associated with (indicated to be for) the second mode of operation (step 820 of FIG. 8). In these steps, the wireless device may consult a stored hotspot profile having or being associated with an indication of use in the first/second modes of operation.

Also in these steps, the wireless device may receive and utilize relevant information elements in beacon and probe responses from the wireless networks. Some of this information is especially pertinent where the networks are configured in accordance with the Wi-Fi Affiance Passpoint certification or specification. The information elements may include one or more of the following: access network type, which identifies whether the hotspot is for public, private, or guest access; an Internet access indicator, such as an indicator bit or Internet bit, which indicates whether the hotspot may be used for Internet access; an advertisement protocol indicator, which indicates whether the hotspot supports GAS/ANQP (see discussion later below); a roaming consortium element, which provides a list of up to three (3) identifiers or names of reachable service providers; venue information, which identifies the venue where the hotspot is situated; homogenous ESSID, which identifies hotspots in a continuous zone; P2P and cross-connect capability; and BSS load element, which is an indicator of current load on the access point (originally from 802.11e).

Given such information, in some embodiments, the wireless device further limits connections in the first mode of operation to those hotspots having an indication (e.g. the Internet access indicator) which indicates that the hotspot may be used for Internet access. Additionally, or alternatively, the wireless device may limit connections in the first mode of operation to hotspots having an indication (e.g. the advertisement protocol indicator) which indicates that the hotspot supports a protocol for automated connection for service (e.g. GAS/ANQP). Put another way, the wireless device may disallow or prohibit connections to hotspots having the indication which indicates that the hotspot may not be used for Internet access, or the indication which indicates that the hotspot does not support the protocol for automated connection for service.

In some embodiments, the wireless device receives the roaming consortium element from the hotspot and identifies at least some of the reachable service providers indicated in this element. Note, however, the roaming consortium element is limited to three (3) service providers. As is apparent, the above information may or may not be sufficient for the wireless device to fully determine whether or not it should select a given hotspot for communication. Thus in some embodiments, if the wireless device identifies that the hotspot supports the protocol for automated connection for service (e.g. GAS/ANQP), then it subsequently sends a request for additional information. The wireless device may use a pre-association protocol allowing the query for such additional parameters, and this protocol may be an Access Network Query Protocol (ANQP). ANQP may be delivered inside a Generic Advertisement Service (GAS). The information elements received via the ANQP may include one or more of the following: venue name information; network authentication type information; roaming consortium list; IP address type availability information; NAI realm list; 3GPP cellular network information; domain name list; hotspot operator friendly name; operating class; hotspot WAN metrics; hotspot connection capability; and NAI home realm.

Given the above, the wireless device may utilize this additional information to identify additional reachable service providers in the hotspots (e.g. in steps 818 and 820 of FIG. 8). More particularly, for example, the wireless device may receive and utilize the NAI realm list, the 3GPP cellular network information, the domain name list, the hotspot operator friendly name, and/or the NAI home realm. The wireless device compares the identifiers with the allowable identifiers programmed in its memory to identify any matches for connection.

Moving ahead, when the wireless device is considering peer-to-peer (P2P) networks or devices (step 822 of FIG. 8), the wireless device will discover P2P networks or devices that are appropriate for and correspond to the first or the second mode of operation. Here, the wireless device may perform P2P discovery operations, such as operations in a scan phase or a find phase, etc., to identify the one or more P2P networks or devices. The wireless device receives information from these P2P networks or devices, including a device type which corresponds to the type of P2P device.

The wireless device identifies whether it is operating in the first mode or the second mode of operation (step 824 of FIG. 8). When in the first mode of operation, the wireless device allows a P2P connection with a P2P device which has a device type that matches the allowable device type associated with (indicated to be for) the first mode of operation (step 826 of FIG. 8). The wireless device disallows, prohibits, or otherwise fails to consider a connection to a P2P device having a device type that fails to match any of the allowable device types. Conversely, when in the second mode of operation, the wireless device may allow a P2P connection to any suitable P2P device; alternatively, the wireless device allows a connection to a P2P device which has a device type that matches an allowable device type associated with (indicated to be for) the second mode of operation (step 828 of FIG. 8).

In some embodiments, the wireless device further limits P2P connections in the first mode of operation to those P2P devices providing an indication (e.g. an Internet access indicator) which indicates that the P2P device has or may be used for Internet access.

In some other embodiments, the wireless device stores P2P profiles which include the allowable device type (see e.g. the description in relation to FIG. 6). Here, the wireless device may attempt to discover P2P devices associated with P2P profiles having a stored indication of use (i.e. for the first or the mode of operation).

In some other embodiments, the wireless device discovers P2P devices having the device type property associated with the selected application for execution (see again e.g. the description in relation to FIG. 6). The wireless device compares this device type property with the allowable device types associated with the first or the second mode of operation. If there is a match, then the connection is allowed, and otherwise the connection is disallowed.

The list of one or more allowable device types for the first mode of operation may include an access point (AP) type. In some embodiments, this list may exclude a phone or smartphone type, which may or may not provide Internet access. A phone or smartphone type may not provide for a secure or reliable connection for the wireless device for Internet access. More generally, the list for the first mode of operation may include device types that are known to be secure, and exclude device types that may not be secure. On the other hand, the list of one or more allowable device types for the second mode of operation may include an access point (AP) type, a phone or smartphone type, or both.

Another variation on the techniques described in relation to FIGS. 7 and 8 is now discussed. In this variation, the IT policy includes one or more allowable hotspot aggregator service identifiers or names corresponding to one or more allowable hotspot aggregator services (e.g. Boingo, iPass, etc.). For example, the IT policy may include aggregator service information for an aggregator service profile which includes the allowable hotspot aggregator service identifier. The information may be more encompassing, including an aggregator identification, an aggregator name, a plurality of wireless network identifiers (e.g. all available SSIDs or a subset thereof, such as SSIDs per current location area), and/or one or more server names (for authentication and/or access), as examples. The information and/or allowable hotspot aggregator service identifiers are stored in memory. The stored information and/or identifiers may be for use in operating in the first mode of operation of the device. In some embodiments, the IT policy excludes some or all wireless network identifiers (e.g. SSIDs) corresponding to available wireless networks of the hotspot aggregator.

The wireless device utilizes an allowable hotspot aggregator service identifier stored in its memory to obtain allowable network identifiers associated therewith. More particularly, for example, for initial hotspot operation, the wireless device associates with a wireless network (hotspot) associated with the allowable hotspot aggregator. Then, the wireless device accesses a server and/or database of this hotspot aggregator to receive a plurality of wireless network identifiers (e.g. BSSIDs and/or SSIDS) corresponding to the available wireless networks of the hotspot aggregator service. The identifiers may be a subset of all identifiers of the hotspot aggregator service (e.g. available networks per current location area). Alternatively, the wireless device may associate and/or connect with any suitable network to access the server and/or database of the hotspot aggregator service for receiving the plurality of network identifiers (e.g. BSSIDs or SSIDs).

When in the first mode of operation, the wireless device allows a connection to a hotspot identified by a network identifier that matches an allowable network identifier. The wireless device disallows or fails to consider a connection to a hotspot identified by a network identifier that fails to match any of the allowable network identifiers. Conversely, when in the second mode of operation, the wireless device may allow any suitable connection; alternatively the wireless device allows a connection to a hotspot identified by a network identifier that matches an allowable network identifier associated with (and indicated to be for) the second mode of operation.

Thus, as provided herein, methods and apparatus for controlling connectivity to wireless networks are described. In one illustrative example, a wireless device receives a communication policy from a private network. The communication policy includes one or more allowable service provider identifiers corresponding to one or more allowable service providers. The allowable service provider identifiers may include, for example, one or more domain names or realms. The wireless device stores these allowable service provider identifiers in memory. Then, the wireless device receives via a wireless network (a "hotspot") one or more reachable service provider identifiers corresponding to one or more reachable service providers which provide service via the wireless network. In a first ("work") mode of operation, the wireless device allows a connection to the wireless network for communications based on a match between one of the first service provider identifiers and one of the reachable service providers in the wireless network. In a second ("personal") mode of operation, the wireless device allows a connection to the wireless network based on a match between a second service provider identifier stored in memory and one of the reachable service provider identifiers.

In another illustrative example, the communication policy includes one or more allowable device types for peer-to-peer (P2P) communications. The wireless device stores in memory the one or more allowable device types. Then, the wireless device receives a device type of and from another wireless device. The wireless device allows a P2P connection with the other wireless device based on identifying a match between one of the allowable device types and the device type received from the other wireless device. On the other hand, the wireless device disallows the P2P connection with the other wireless device based on identifying that none of the allowable device types match the device type received from the other wireless device. For this technique, the wireless device may operate in a first ("work") mode of operation. Further, in a second ("personal") mode of operation, the wireless device allows the P2P connection with the other wireless device based on identifying a match between one or more other allowable device types and the device type received from the other wireless device. The one or more allowable device types for the first mode of operation may include an access point (AP) type. The one or more allowable device types for the first mode of operation may exclude a phone or smartphone type. The one or more allowable device types for the second mode of operation may include a phone or smartphone type.

In even another illustrative example, the communication policy includes one or more allowable hotspot aggregator service identifiers or names corresponding to one or more allowable hotspot aggregator services. The wireless device stores in memory the allowable hotspot aggregator service identifier or name. The wireless device then receives, from a database of the allowable hotspot aggregator service, a plurality of allowable network identifiers corresponding to one or more allowable wireless networks, and stores the allowable network identifiers in its memory. The wireless device then receives from a wireless network an available network identifier which identifies the wireless network, and allows a connection to the wireless network for communications based on identifying a match between one of the allowable network identifiers and the available network identifier.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11 based network, for example, different environments may be applicable as well. As a few other examples, the wireless networking may be based on a WiMAX network (i.e. IEEE 802.16), or an Ultra-WideBand (UWB) network (i.e. IEEE 802.15). The invention described herein in the recited claims intends to cover and embrace all suitable changes in technology.

What is claimed is:

1. A method in a wireless device for wireless communications, the method comprising:
   receiving, at a processor of the wireless device via a wireless transceiver of the wireless device, communication policy data from a private network, the communication policy data comprising one or more allowable service provider identifiers corresponding to one or more allowable service providers;
   storing in memory of the wireless device the one or more allowable service provider identifiers;
   receiving, at the processor, via the wireless transceiver, data from a wireless network comprising a hotspot, the data comprising one or more reachable service provider identifiers corresponding to one or more reachable service providers which provide service via the wireless network;
   in response to determining, at the processor, that the wireless device is operating in a first mode:
      allowing a connection, via the wireless transceiver, to the wireless network for communications therewith based on identifying that at least one of the allowable service provider identifiers matches the reachable service provider; and
   disallowing the connection via the wireless transceiver to the wireless network based on identifying that none of the allowable service provider identifiers match the reachable service provider identifiers; and
   in response to determining, at the processor, that the wireless device is operating in a second mode:
      allowing the connection via the transceiver to the wireless network for communications therewith based on the reachable service providers irrespective of the allowable service provider identifiers.

2. The method of claim 1, wherein the one or more allowable service provider identifiers comprise one or more first allowable service provider identifiers, the method further comprising:
   storing in the memory of the wireless device one or more second allowable service provider identifiers corresponding to one or more second allowable service providers; and
   in response to determining, at the processor, that the wireless device is operating in the second mode of operation:
      allowing the connection, via the wireless transceiver, to the wireless network for communications therewith based on identifying a match between one of the second allowable service provider identifiers and one of the reachable service provider identifiers.

3. The method of claim 2, wherein the first mode of operation comprises a work mode of operation and the second mode of operation comprises a personal mode of operation.

4. The method of claim 1, wherein the one or more allowable service provider identifiers comprise one or more realms or Network Address Identifier (NAI) realms.

5. The method of claim 1, further comprising:
   performing an access network query protocol via the wireless network for receiving at least one of the reachable service provider identifiers.

6. The method of claim 1, further comprising:
   identifying, at the processor, whether the wireless network is configured in accordance with a protocol for automated connection for service; and disallowing the connection, via the wireless transceiver, to the wireless network in response to determining, at the processor, that the wireless network is not configured in accordance with the protocol for automated connection for service.

7. The method of claim 6, wherein the protocol for automated connection for service comprises a protocol in accordance with the Wi-Fi Alliance Hotspot Specification.

8. The method of claim 1, further comprising:
in response to determining, at the processor, that the wireless network is configured in accordance with a protocol for automated connection for service, allowing the connection via the wireless transceiver, to the wireless network for communications therewith based on identifying the match between one of the allowable service provider identifiers and one of the reachable service provider identifiers, and otherwise disallowing the connection via the wireless transceiver, to the wireless network.

9. The method of claim 1,
wherein each allowable service provider is an allowable device type for peer-to-peer (P2P) communications;
wherein the data comprising the one or more reachable service provider identifiers is received from at least one other wireless device via the wireless network;
wherein each reachable service provider is a device type of each other wireless device; and
wherein allowing a connection, via the wireless transceiver, to the wireless network for communications therewith based on identifying that at least one of the allowable service provider identifiers matches the reachable service provider comprises allowing a P2P connection with the at least one other wireless device.

10. A computer program product, comprising:
a non-transitory computer readable medium;
computer instructions stored in the non-transitory computer readable medium;
the computer instructions being executable by one or more processors of a wireless communication device for:
receiving, at the one or more processors, communication policy data via a wireless transceiver of the wireless communication device from a private network, the communication policy data comprising one or more allowable service provider identifiers corresponding to one or more allowable service providers;
storing in memory of the wireless communication device the one or more allowable service provider identifiers;
receiving, at the one or more processors, via the wireless transceiver data from a wireless network comprising a hotspot, the data comprising one or more reachable service provider identifiers corresponding to one or more reachable service providers which provide service via the wireless network;
in response to determining that the wireless device is operating in a first mode:
allowing a connection, via the wireless transceiver, to the wireless network for communications therewith based on identifying that at least one of the allowable service provider identifiers matches the reachable service provider;
disallowing, the connection via the wireless transceiver to the wireless network based on identifying that none of the allowable service provider identifiers match the reachable service provider identifiers;
in response to determining, at the processor, that the wireless device is operating in a second mode:
allowing the connection via the transceiver to the wireless network for communications therewith based on the reachable service providers irrespective of the allowable service provider identifiers.

11. A wireless communication device, comprising:
one or more processors;
memory coupled to the one or more processors;
a wireless transceiver coupled to the one or more processors, the wireless transceiver being configured to provide for wireless communications;
the one or more processors being configured for:
receiving, via the wireless transceiver, communication policy data from a private network, the communication policy data comprising one or more allowable service provider identifiers corresponding to one or more allowable service providers;
storing the one or more allowable service provider identifiers in the memory;
receiving, via the wireless transceiver, data from a wireless network comprising a hotspot, the data one or more reachable service provider identifiers corresponding to one or more reachable service providers which provide service via the wireless network;
in response to determining that the wireless communication device is operating in a first mode:
allowing a connection, via the wireless transceiver, to the wireless network for communications therewith based on identifying that at least one of the allowable service provider identifiers matches the reachable service provider;
disallowing, the connection via the wireless transceiver to the wireless network based on identifying that none of the allowable service provider identifiers match the reachable service provider identifiers; and
in response to determining, at the processor, that the wireless communication device is operating in a second mode:
allowing the connection via the transceiver to the wireless network for communications therewith with based on the reachable service providers irrespective of the allowable service provider identifiers.

12. The wireless device of claim 11, wherein the one or more allowable service provider identifiers comprise one or more first allowable service provider identifiers, the one or more processors being further configured for:
storing in the memory one or more second allowable service provider identifiers corresponding to one or more second allowable service providers; and
in response to determining that the wireless communication device is operating in the second mode of operation:
allowing the connection via the wireless transceiver to the wireless network for communications therewith based on identifying a match between one of the second allowable service provider identifiers and one of the reachable service provider identifiers.

13. The wireless device of claim 11, wherein the one or more processors are further configured for:
performing an access network query protocol via the wireless network for receiving at least one of the reachable service provider identifiers.

14. The wireless device of claim 11, wherein the one or more processors are further configured for:

identifying whether the wireless network is configured in accordance with a protocol for automated connection for service; and disallowing the connection to the wireless network in response to determining that the wireless network is not configured in accordance with the protocol for automated connection for service.

15. The wireless device of claim 14, wherein the protocol for automated connection for service comprises a protocol in accordance with the Wi-Fi Alliance Hotspot Specification.

16. The wireless device of claim 11, wherein the one or more processors are further configured for:

in response to determining that the wireless network is configured in accordance with the protocol for automated connection for service, allowing the connection via the wireless transceiver to the wireless network for communications therewith based on identifying a match between one of the first allowable service provider identifiers and one of the reachable service provider identifiers, otherwise disallowing the connection via the wireless transceiver to the wireless network.

17. The wireless device of claim 12, wherein the first mode of operation comprises a work mode of operation and the second mode of operation comprises a personal mode of operation.

18. The wireless device of claim 11, wherein the allowable service provider identifiers comprise one or more Passpoint realms.

19. A method in a wireless device for wireless communications, the method comprising:

receiving, at a processor via a wireless transceiver of the wireless device, communication policy data from a private network, the communication policy data including an allowable hotspot aggregator service identifier or name corresponding to an allowable hotspot aggregator service;

storing in memory of the wireless device the allowable hotspot aggregator service identifier or name;

receiving, from a database of the allowable hotspot aggregator service, a plurality of allowable network identifiers corresponding to one or more allowable wireless networks;

storing in the memory of the wireless device the allowable network identifiers;

receiving, via the wireless transceiver, data from d wireless network comprising a hotspot, the data comprising an available network identifier which identifies the wireless network; and in response to determining, at the processor, that the wireless device is operating in a first mode:

allowing a connection, via the wireless transceiver, to the wireless network for communications therewith based on identifying that the allowable hotspot aggregator service identifier or name matches the available network identifier; and disallowing, connection to the wireless network for communications based on identifying that the allowable network identifiers does not match the available network identifier; and in response to determining, at the processor, that the wireless device is operating in a second mode:

allowing the connection via the transceiver to the wireless network for communications therewith based on the allowable hotspot aggregator service identifier or name irrespective of the available network identifier.

* * * * *